US011123748B1

(12) United States Patent
Metcalf

(10) Patent No.: US 11,123,748 B1
(45) Date of Patent: Sep. 21, 2021

(54) AMMUNITION DISPOSAL SYSTEM

(71) Applicant: William C. Metcalf, Washington, VA (US)

(72) Inventor: William C. Metcalf, Washington, VA (US)

(*) Notice: Subject to any disclaimer, the term of this patent is extended or adjusted under 35 U.S.C. 154(b) by 287 days.

(21) Appl. No.: 16/375,726

(22) Filed: Apr. 4, 2019

(51) Int. Cl.
*B02C 23/36* (2006.01)
*F42D 5/04* (2006.01)
*B02C 18/22* (2006.01)
*B02C 18/18* (2006.01)
*B02C 18/24* (2006.01)
*B02C 18/08* (2006.01)

(52) U.S. Cl.
CPC ............. *B02C 23/36* (2013.01); *B02C 18/08* (2013.01); *B02C 18/182* (2013.01); *B02C 18/2216* (2013.01); *B02C 18/24* (2013.01); *F42D 5/04* (2013.01)

(58) Field of Classification Search
CPC ... B02C 23/36; B02C 18/2216; B02C 18/182; B02C 18/08; B02C 18/24; B02C 18/2258
USPC ....................................................... 241/46.01
See application file for complete search history.

(56) References Cited

U.S. PATENT DOCUMENTS

| | | | |
|---|---|---|---|
| 3,716,197 A * | 2/1973 | Craig | B02C 18/0092 241/43 |
| 3,814,336 A * | 6/1974 | Brewer | B03B 5/52 241/79.1 |
| 4,094,470 A * | 6/1978 | Waldhofer | B02C 4/00 241/46.01 |
| 4,570,863 A * | 2/1986 | Knox, Jr. | B02C 23/36 241/33 |
| 5,104,047 A * | 4/1992 | Simmons | B02C 23/36 241/20 |
| 5,451,004 A * | 9/1995 | Altonji | B02C 18/0092 209/234 |
| 5,593,098 A * | 1/1997 | Spencer | D21D 5/02 241/46.01 |
| 6,220,534 B1 * | 4/2001 | Kratochwill | B02C 17/02 241/21 |
| 7,886,997 B2 * | 2/2011 | Tschantz | B02C 18/145 241/65 |
| 8,448,886 B2 * | 5/2013 | Santandrea | B02C 18/0084 241/46.013 |
| 8,757,527 B2 * | 6/2014 | Amano | B02C 7/11 241/46.06 |

(Continued)

*Primary Examiner* — Faye Francis
(74) *Attorney, Agent, or Firm* — Shaddock Law Group, PC

(57) ABSTRACT

An ammunition disposal system having a chute access portion; a collection chamber attached such that a chute access portion interior cavity is in fluid communication with a collection chamber interior cavity; a shredder assembly attached such that the collection chamber interior cavity is in fluid communication with a shredder assembly interior cavity, with one or more shredder blade assemblies positioned within the shredder assembly interior cavity; a hopper attached such that the shredder assembly interior cavity is in fluid communication with a hopper interior cavity; an extractor attached such that the hopper interior cavity is in fluid communication with an extractor interior cavity, and wherein an auger is positioned within at least a portion of the extractor interior cavity; and a liquid contained within at least a portion of the collection chamber interior cavity, the shredder assembly interior cavity, the hopper interior cavity, and the extractor interior cavity.

16 Claims, 5 Drawing Sheets

(56) References Cited

U.S. PATENT DOCUMENTS

| | | | |
|---|---|---|---|
| 8,890,944 B1 | 11/2014 | Reynolds | |
| 9,106,809 B2 | 8/2015 | Reynolds | |
| 9,327,291 B2* | 5/2016 | Brodt | B03B 5/36 |
| 9,421,728 B2* | 8/2016 | Santandrea | B30B 15/302 |
| 10,464,073 B2* | 11/2019 | Yuan | B02C 23/10 |
| 2011/0089274 A1* | 4/2011 | Amano | B02C 7/08 |
| | | | 241/46.02 |
| 2014/0027546 A1* | 1/2014 | Kean | F04D 7/045 |
| | | | 241/21 |
| 2016/0008781 A1* | 1/2016 | Nold | B02C 18/14 |
| | | | 241/15 |
| 2016/0288136 A1* | 10/2016 | Yuan | B02C 23/38 |
| 2017/0312759 A1* | 11/2017 | Steinwender | B03D 1/016 |
| 2017/0326602 A1* | 11/2017 | Peng | B09B 3/0091 |
| 2018/0057374 A1* | 3/2018 | Maghas | C05F 7/00 |
| 2018/0354007 A1* | 12/2018 | Daneu | C05F 9/04 |
| 2020/0147618 A1* | 5/2020 | Lou | B02C 18/2216 |

\* cited by examiner

AMMUNITION DISPOSAL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of ammunition disposal systems. More specifically, the presently disclosed systems, methods, and/or apparatuses relates to an ammunition disposal system having an at least partially liquid filled destruction chamber.

2. Description of Related Art

Every year, an estimated 12 billion rounds of ammunition are sold in the United States. Moreover, all ammunition has a limited shelf life due to degradation but can remain dangerous for many years after expiration.

The Department of Justice issued a five year summary that studied forfeiture trends by federal law enforcement from 2013 to 2017. The five year summary revealed illegally possessed firearms & ammunition seizures increased 19% and was forecast to rise. In 2018, the Department of Justice reported a 20% spike in firearms & ammunition seizures which amounted to 68% of all assets seized.

State and federal law enforcement and the Department of Defense consistently have a need to destroy outdated or unwanted small arms ammunition. Law enforcement regularly seizes large quantities of small arms ammunition during criminal investigations. In addition, small arms ammunition is regularly abandoned to law enforcement as a result of being unwanted, corroded or unusable (natural disasters, etc.). The Department of Defense is the largest consumer and stockpiler of small arms ammunition. Each year the Department of Defense identifies millions of rounds of outdated and degraded small arms ammunition for destruction.

Further, there are few options available to destroy small arms ammunition. As a result, many law enforcement agencies stockpile degraded, unwanted, corroded & unusable small arms ammunition due to the lack of access to a quick, consistent and effective destruction method. Small arms ammunition has significantly evolved since the 1800's but the means in which to dispose of bulk ammunition has not. Most small arms ammunition has historically been destroyed through the use of a thermal treatment or open air burns that can pose a threat to the environment and citizens living in the immediate area. Ammunition burns have reportedly caused groundwater, soil, sediment, foliage and surface water contamination and released heavy metals and carcinogens into the atmosphere.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Based on these and other shortcomings of the current methods for disposal of small arms ammunition, the systems, methods, and/or apparatuses of the present disclosure provide, among other things, an ammunition disposal system that can quickly, effectively, consistently, and continuously destroy small arms ammunition without emissions. Certain exemplary embodiments, the systems, methods, and/or apparatuses of the present disclosure optionally provide a mobile ammunition disposal system to transport to storage locations maintained by law enforcement and the Department of Defense for on-sight small arms destruction.

In various exemplary, non-limiting embodiments, the disclosed ammunition disposal system comprises a disposal unit having an inlet chute, a sealed destruction chamber (at least partially filled with a liquid), an outlet hopper, and an extractor.

In various exemplary, nonlimiting embodiments, the ammunition disposal system of the present disclosure comprises at least some of a chute having an interior channel or cavity and extending to a chute output aperture; a chute access portion having an interior channel or cavity and extending from a chute access input aperture to a chute access output aperture, wherein the chute is attached or coupled to the chute access portion such that the chute output aperture is aligned with the chute access input aperture and the interior channel or cavity of the chute is in communication with the interior channel or cavity of the chute access portion; a collection chamber having an interior channel or cavity and extending from a collection chamber input aperture to a collection chamber access output aperture, wherein the collection chamber is attached or coupled to the chute access portion such that the chute access portion output aperture is aligned with the collection chamber input aperture and the interior channel or cavity of the chute access portion is in communication with the interior channel or cavity of the collection chamber, and wherein the chute access portion is attached or coupled to the collection chamber such that a hermetic or watertight seal is formed between the interior channel or cavity of the chute access portion and the interior channel or cavity of the collection chamber; a shredder assembly having an interior channel or cavity and extending from an shredder assembly input aperture to a shredder assembly output aperture, wherein the shredder assembly is attached or coupled to the collection chamber such that the collection chamber output aperture is aligned with the shredder assembly input aperture and the interior channel or cavity of the collection chamber is in communication with the interior channel or cavity of the shredder assembly, wherein the collection chamber is attached or coupled to the shredder assembly such that a hermetic or watertight seal is formed between the interior channel or cavity of the mission chamber and the interior channel or cavity of the shredder assembly, and wherein one or more shredder blade assemblies are positioned within the interior channel or cavity of the shredder assembly; a hopper having an interior channel or cavity and extending from a hopper input aperture to a hopper access output aperture, wherein the hopper is attached or coupled to the shredder assembly such that the shredder assembly output aperture is aligned with the hopper input aperture and the interior channel or cavity of the shredder assembly is in communication with the interior channel or cavity of the hopper, and wherein the shredder assembly is attached or coupled to the hopper such that a hermetic or watertight seal is formed between the interior channel or cavity of the shredder assembly and the interior channel or cavity of the hopper; an extractor having an interior channel or cavity and extending from an extractor input aperture to an extractor output aperture, wherein the extractor is attached or coupled to the hopper such that the hopper output aperture is aligned with the extractor input aperture and the interior channel or cavity of the hopper is in communication with the interior channel or cavity of the extractor, wherein the hopper is attached or coupled to the extractor such that a hermetic or watertight seal is formed between the interior channel or cavity of the hopper and the interior channel or cavity of the extractor, and wherein an auger is positioned within at least a portion of the interior channel or cavity of the extractor; and a liquid contained within at least a portion of the interior channel or cavity of the collection chamber, the interior channel or cavity of the shredder assembly, the interior channel or cavity of the hopper, and the interior channel or cavity of the extractor.

In various exemplary, nonlimiting embodiments, the interior channel or cavity of the chute is formed by one or more interior sidewalls.

In various exemplary, nonlimiting embodiments, the chute comprises substantially parallel or inwardly sloping walls or wall portions.

In various exemplary, nonlimiting embodiments, the chute includes an open upper portion, which allows access to the interior channel or cavity of the chute.

In various exemplary, nonlimiting embodiments, the interior channel or cavity of the chute access portion is formed by one or more interior sidewalls.

In various exemplary, nonlimiting embodiments, a chute access door is formed or positioned within at least a portion of the chute access portion, and wherein the chute access door allows access to the interior channel or cavity of the chute or allows access to the interior channel or cavity of the chute access portion.

In various exemplary, nonlimiting embodiments, the interior channel or cavity of the collection chamber is formed by one or more interior sidewalls.

In various exemplary, nonlimiting embodiments, at least a portion of the interior channel or cavity of the collection chamber is substantially spherical.

In various exemplary, nonlimiting embodiments, a liquid inlet and a liquid outlet are formed through at least a portion of the collection chamber and are in fluid communication with the interior channel or cavity of the collection chamber, wherein the liquid inlet and the liquid outlet allow the fluid to be communicated into and out of the interior channel or cavity of the collection chamber.

In various exemplary, nonlimiting embodiments, a pump is in fluid communication with the liquid inlet or the liquid outlet, so as to allow the fluid to be pumped into and/or out of the interior channel or cavity of the collection chamber.

In various exemplary, nonlimiting embodiments, a pump is in fluid communication, via one or more hoses or pipes, with the liquid inlet or the liquid outlet, so as to allow the fluid to be pumped into and/or out of the interior channel or cavity of the collection chamber.

In various exemplary, nonlimiting embodiments, the pump comprises a filter, which allows the liquid to be filtered as it passes through at least a portion of the pump.

In various exemplary, nonlimiting embodiments, a motor supplies a rotational force to the shredder blade assemblies.

In various exemplary, nonlimiting embodiments, the auger is positioned within at least a portion of the interior channel or cavity of the extractor, such that as material enters the extractor input aperture, the material is transferred, via the auger, along the interior channel or cavity of the extractor, toward the extractor output aperture.

In various exemplary, nonlimiting embodiments, a motor supplies a rotational force to the auger.

In various exemplary, nonlimiting embodiments, the extractor output aperture is positioned above at least a portion of the collection chamber.

In various exemplary, nonlimiting embodiments, a valve is positioned proximate the extractor input aperture such that when the valve is in an open position, the liquid is permitted to flow through the valve, and out of the interior channel or cavity of the extractor.

In various exemplary, nonlimiting embodiments, at least a portion of the collection chamber comprises steel or ballistic steel.

In various exemplary, nonlimiting embodiments, the liquid is selected based upon the ability of the liquid to keep various components or elements of the ammunition to be destroyed from igniting or exploding, the specific gravity of the liquid, or the viscosity of the liquid.

In various exemplary, nonlimiting embodiments, the ammunition disposal system of the present disclosure comprises at least some of a chute access portion having an interior channel or cavity and extending from a chute access input aperture to a chute access output aperture; a collection chamber having an interior channel or cavity and extending from a collection chamber input aperture to a collection chamber access output aperture, wherein the collection chamber is attached or coupled to the chute access portion such that the chute access portion output aperture is aligned with the collection chamber input aperture and the interior channel or cavity of the chute access portion is in communication with the interior channel or cavity of the collection chamber, and wherein the chute access portion is attached or coupled to the collection chamber such that a hermetic or watertight seal is formed between the interior channel or cavity of the chute access portion and the interior channel or cavity of the collection chamber; a shredder assembly having an interior channel or cavity and extending from an shredder assembly input aperture to a shredder assembly output aperture, wherein the shredder assembly is attached or coupled to the collection chamber such that the collection chamber output aperture is aligned with the shredder assembly input aperture and the interior channel or cavity of the collection chamber is in communication with the interior channel or cavity of the shredder assembly, wherein the collection chamber is attached or coupled to the shredder assembly such that a hermetic or watertight seal is formed between the interior channel or cavity of the mission chamber and the interior channel or cavity of the shredder assembly, and wherein one or more shredder blade assemblies are positioned within the interior channel or cavity of the shredder assembly; a hopper having an interior channel or cavity and extending from a hopper input aperture to a hopper access output aperture, wherein the hopper is attached or coupled to the shredder assembly such that the shredder assembly output aperture is aligned with the hopper input aperture and the interior channel or cavity of the shredder assembly is in communication with the interior channel or cavity of the hopper, and wherein the shredder assembly is attached or coupled to the hopper such that a hermetic or watertight seal is formed between the interior channel or cavity of the shredder assembly and the interior channel or cavity of the hopper; an extractor having an interior channel or cavity and extending from an extractor input aperture to an extractor output aperture, wherein the extractor is attached or coupled to the hopper such that the hopper output aperture is aligned with the extractor input aperture and the interior channel or cavity of the hopper is in communication with the interior channel or cavity of the extractor, wherein the hopper is attached or coupled to the extractor such that a hermetic or watertight seal is formed between the interior channel or cavity of the hopper and the interior channel or cavity of the extractor, and wherein an auger is positioned within at least a portion of the interior channel or cavity of the extractor; and a liquid contained within at least a portion of the interior channel or cavity of the collection chamber, the interior channel or cavity of the shredder assembly, the interior channel or cavity of the hopper, and the interior channel or cavity of the extractor.

In various exemplary, nonlimiting embodiments, the method for disposing of ammunition using an ammunition disposal system comprises filling at least a portion of an interior channel or cavity of a collection chamber, an interior channel or cavity of a shredder assembly, an interior channel or cavity of a hopper, and an interior channel or cavity of an extractor with a liquid; depositing ammunition within the interior channel or cavity of the collection chamber; allowing the deposited ammunition to pass through the interior channel or cavity of the collection chamber and into the interior channel or cavity of the shredder assembly, wherein the ammunition is at least partially disassembled via one or more rotating shredder blade assemblies positioned within the interior channel or cavity of the shredder assembly; allowing components of the disassembled ammunition to pass from the interior channel or cavity of the shredder assembly, through the interior channel or cavity of the hopper, and into the interior channel or cavity of the extractor; and engaging the components of the disassembled ammunition, via an auger positioned at least partially within the interior channel or cavity of the extractor to move the components of the disassembled ammunition through the interior channel or cavity of the extractor and through an extractor output aperture.

In various exemplary, nonlimiting embodiments, the method further comprises allowing the components of the disassembled ammunition having a specific gravity less than a specific gravity of the liquid to float to a surface of the liquid within the interior channel or cavity of the collection chamber In various exemplary, nonlimiting embodiments, the ammunition disposal system of the present disclosure comprises at least some of a chute access portion having an interior channel or cavity; a collection chamber having an interior channel or cavity, wherein the collection chamber is attached or coupled to the chute access portion such that the interior channel or cavity of the chute access portion is in communication with the interior channel or cavity of the collection chamber such that a hermetic or watertight seal is formed between the interior channel or cavity of the chute access portion and the interior channel or cavity of the collection chamber; a shredder assembly, wherein the shredder assembly is attached or coupled to the collection chamber such that the interior channel or cavity of the collection chamber is in communication with the interior channel or cavity of the shredder assembly such that a hermetic or watertight seal is formed between the interior channel or cavity of the mission chamber and the interior channel or cavity of the shredder assembly, and wherein one or more shredder blade assemblies are positioned within the interior channel or cavity of the shredder assembly; a hopper having an interior channel or cavity, wherein the hopper is attached or coupled to the shredder assembly such that the interior channel or cavity of the shredder assembly is in communication with the interior channel or cavity of the hopper such that a hermetic or watertight seal is formed between the interior channel or cavity of the shredder assembly and the interior channel or cavity of the hopper; an extractor having an interior channel or cavity, wherein the extractor is attached or coupled to the hopper such that the interior channel or cavity of the hopper is in communication with the interior channel or cavity of the extractor such that a hermetic or watertight seal is formed between the interior channel or cavity of the hopper and the interior channel or cavity of the extractor, and wherein an auger is positioned within at least a portion of the interior channel or cavity of the extractor; and a liquid contained within at least a portion of the interior channel or cavity of the collection chamber, the interior channel or cavity of the shredder assembly, the interior channel or cavity of the hopper, and the interior channel or cavity of the extractor.

In various exemplary, nonlimiting embodiments, the ammunition disposal system of the present disclosure comprises at least some of a chute access portion; a collection chamber attached or coupled to the chute access portion such that an interior cavity of the chute access portion is in fluid communication with an interior cavity of the collection chamber; a shredder assembly attached or coupled to the collection chamber such that the interior cavity of the collection chamber is in fluid communication with an interior cavity of the shredder assembly, and wherein one or more shredder blade assemblies are positioned within the interior cavity of the shredder assembly; a hopper attached or coupled to the shredder assembly such that the interior cavity of the shredder assembly is in fluid communication with an interior cavity of the hopper; an extractor attached or coupled to the hopper such that the interior cavity of the hopper is in fluid communication with an interior cavity of the extractor, and wherein an auger is positioned within at least a portion of the interior cavity of the extractor; and a liquid contained within at least a portion of the interior cavity of the collection chamber, the interior cavity of the shredder assembly, the interior cavity of the hopper, and the interior cavity of the extractor.

Accordingly, the presently disclosed systems, methods, and/or apparatuses separately and optionally provide an ammunition disposal system and method for destroying small arms ammunition without emitting potential heavy metal and carcinogens into the atmosphere.

The presently disclosed systems, methods, and/or apparatuses separately and optionally provide an ammunition disposal system having an at least partially liquid filled destruction chamber.

The presently disclosed systems, methods, and/or apparatuses separately and optionally provide an ammunition disposal system that allows for capturing and potentially recycling various components of small arms ammunition.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures.

While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
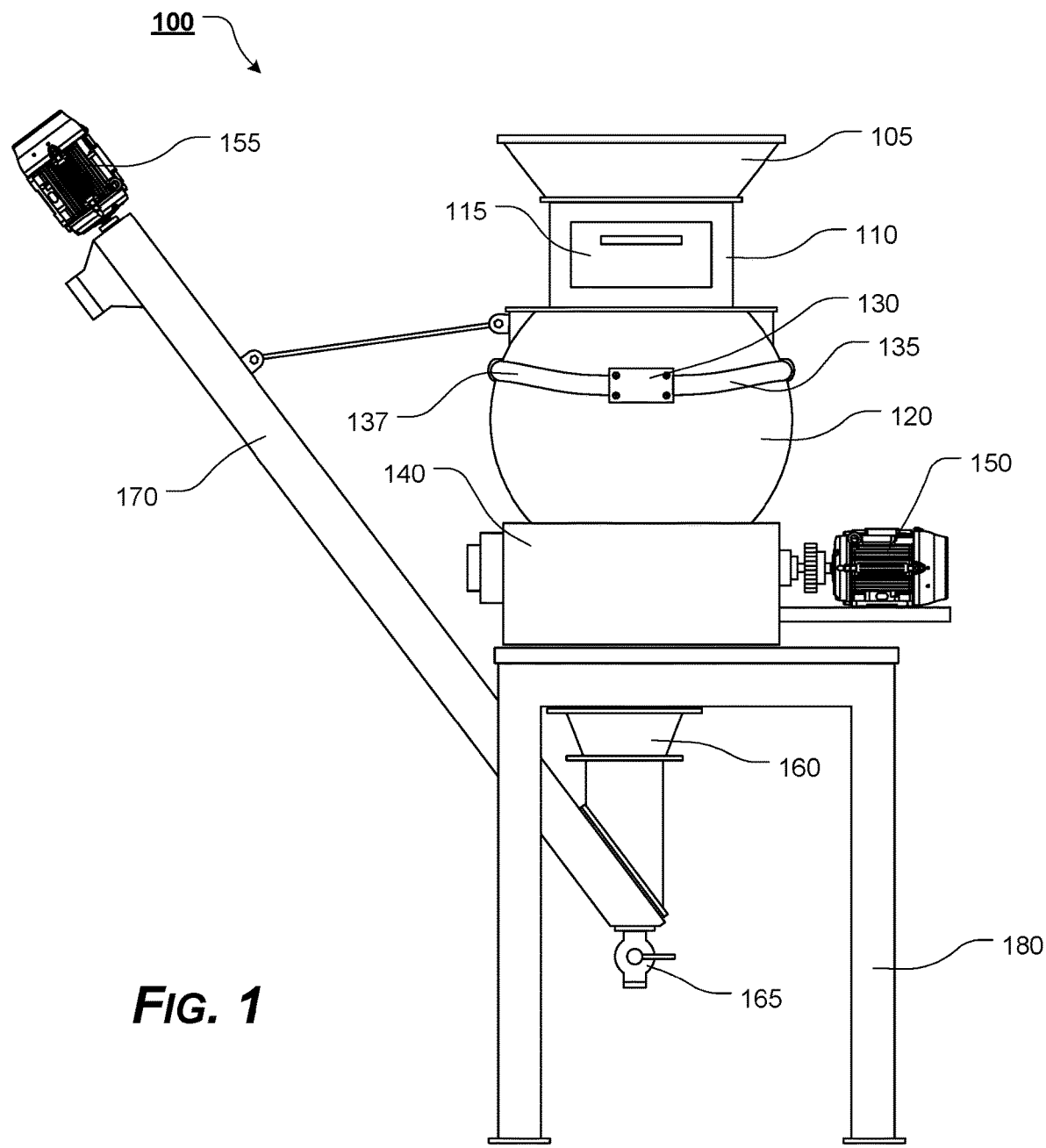
FIG. 1 illustrates a block diagram of various components of an exemplary embodiment of an ammunition disposal system, according to the presently disclosed systems, methods, and/or apparatuses.
Figure 2:
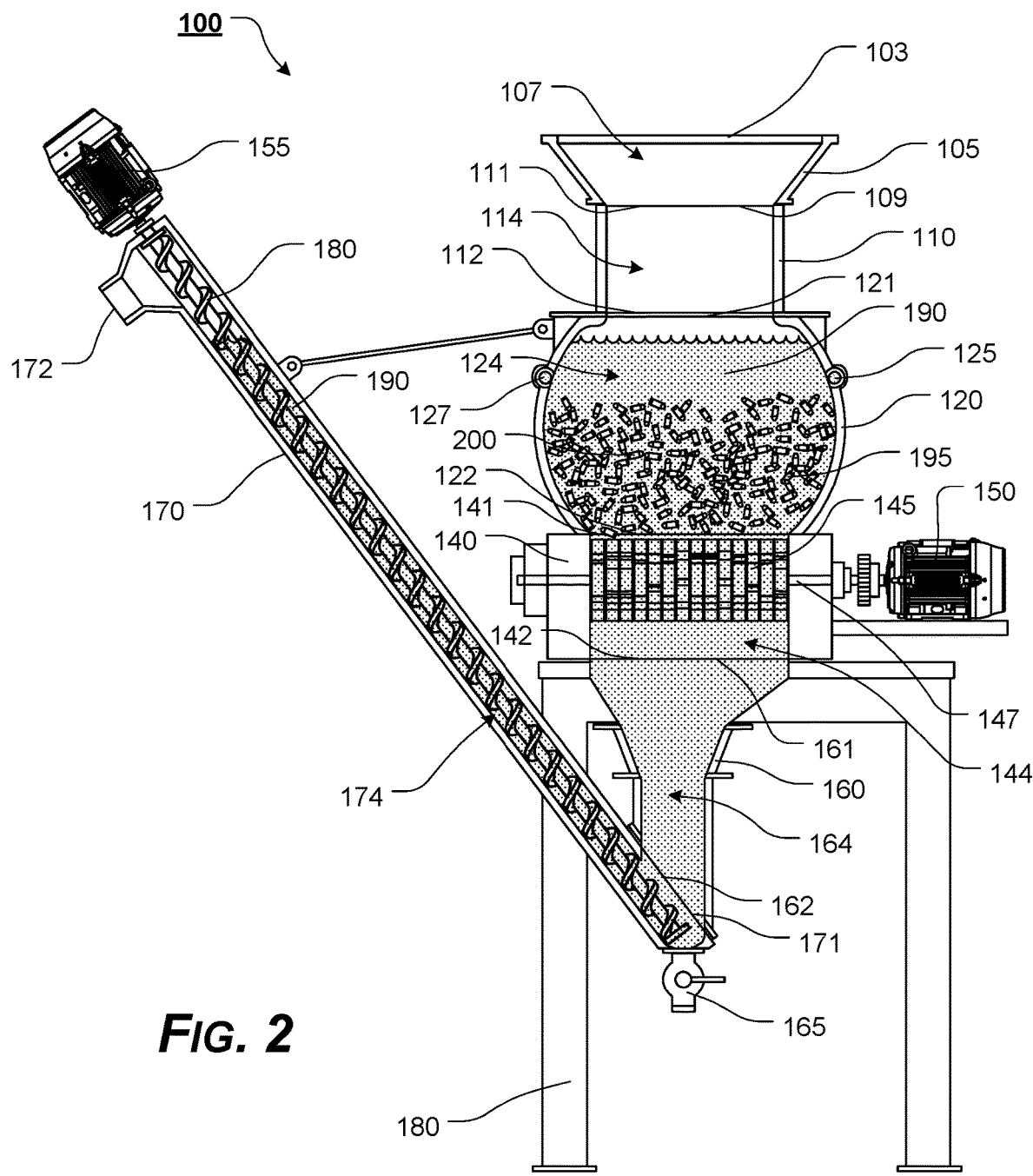
FIG. 2 illustrates a partial cross-sectional view of a block diagram of various components of an exemplary embodiment of an ammunition disposal system, according to the presently disclosed systems, methods, and/or apparatuses.
Figure 3:
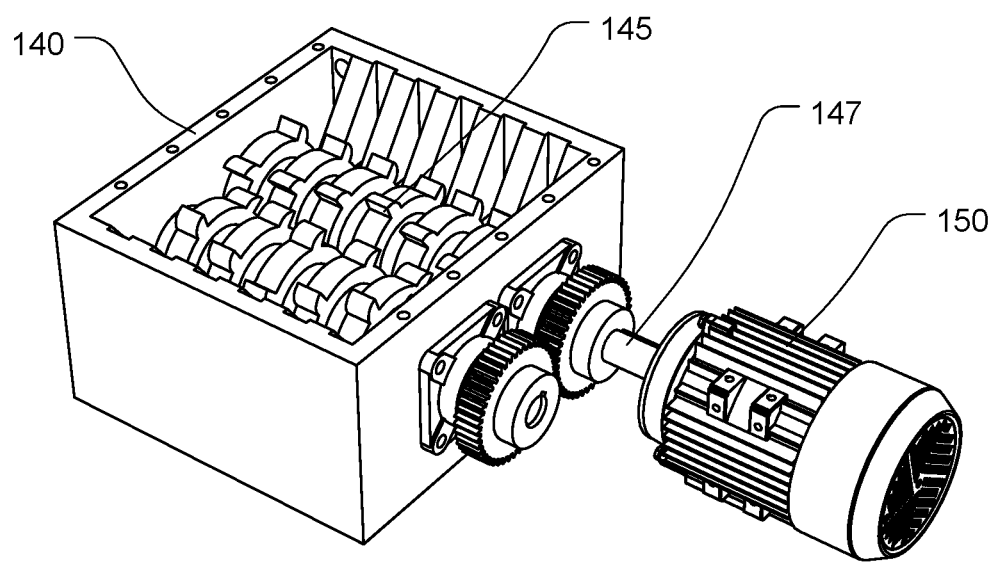
FIG. 3 illustrates a more detailed, perspective view of an exemplary embodiment of a shredder assembly housing to be utilized as part of the ammunition disposal system, according to the presently disclosed systems, methods, and/or apparatuses.
Figure 4:
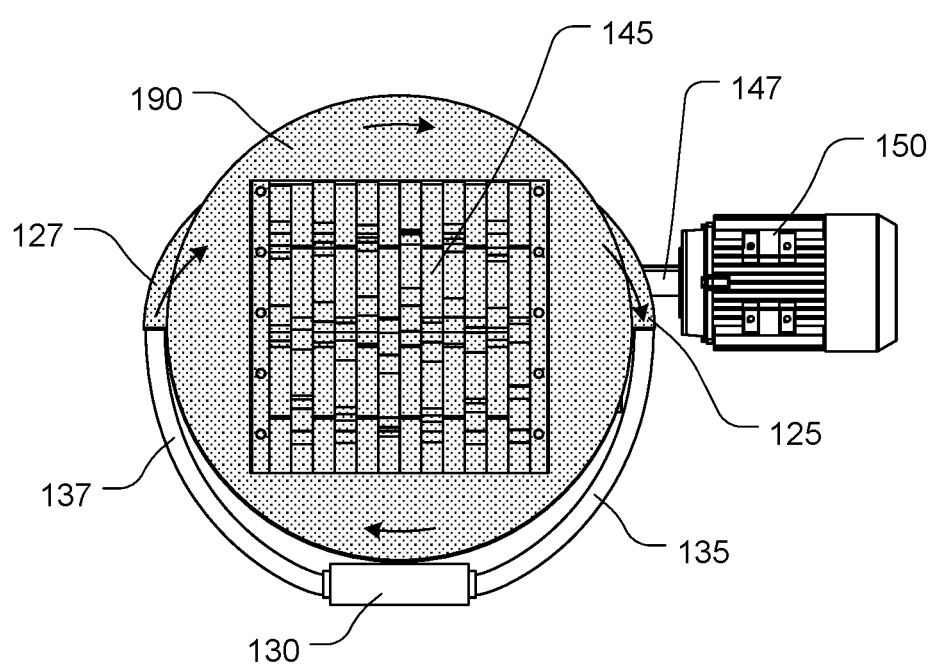
FIG. 4 illustrates a more detailed, partial cross-sectional view of an exemplary embodiment of certain components of the ammunition disposal system, according to an exemplary embodiment of the presently disclosed systems, methods, and/or apparatuses.

For simplicity and clarification, the design factors and operating principles of the ammunition disposal system according to the presently disclosed systems, methods, and/or apparatuses are explained with reference to various exemplary embodiments of an ammunition disposal system according to the presently disclosed systems, methods, and/or apparatuses. The basic explanation of the design factors and operating principles of the ammunition disposal system is applicable for the understanding, design, and operation of the ammunition disposal system of the presently disclosed systems, methods, and/or apparatuses. It should be appreciated that the ammunition disposal system can be adapted to many applications where an ammunition disposal system can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

As used herein, and unless the context dictates otherwise, the term "coupled" is intended to include both direct coupling (in which two elements that are coupled to each other contact each other) and indirect coupling (in which at least one additional element is located between the two elements). The term coupled, as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "ammunition disposal system", "ammunition", "small arms ammunition", and "small arms" are used for basic explanation and understanding of the operation of the systems, methods, and apparatuses of the presently disclosed systems, methods, and/or apparatuses. Therefore, the terms "ammunition disposal system", "ammunition", "small arms ammunition", and "small arms" are not to be construed as limiting the systems, methods, and apparatuses of the presently disclosed systems, methods, and/or apparatuses. For example, the terms "ammunition" and/or "small arms ammunition" refer to the complete round/cartridge or the components of the round/cartridge, including bullets or projectiles, cartridge cases, primers/caps, and/or propellants that are used in small arms. Small arms is also a term used to describe portable firearms such as handguns, rifles, carbines, shotguns, submachine guns, assault rifles, and/or light machine guns.

For simplicity and clarification, the ammunition disposal system of the presently disclosed systems, methods, and/or apparatuses will be shown and/or described as being used in conjunction with small arms ammunition. However, it should be appreciated that these are merely exemplary embodiments of the ammunition disposal system and are not to be construed as limiting the presently disclosed systems, methods, and/or apparatuses. Thus, the ammunition disposal system of the presently disclosed systems, methods, and/or apparatuses may be utilized in the disposal of any object or device.

Figure 5:
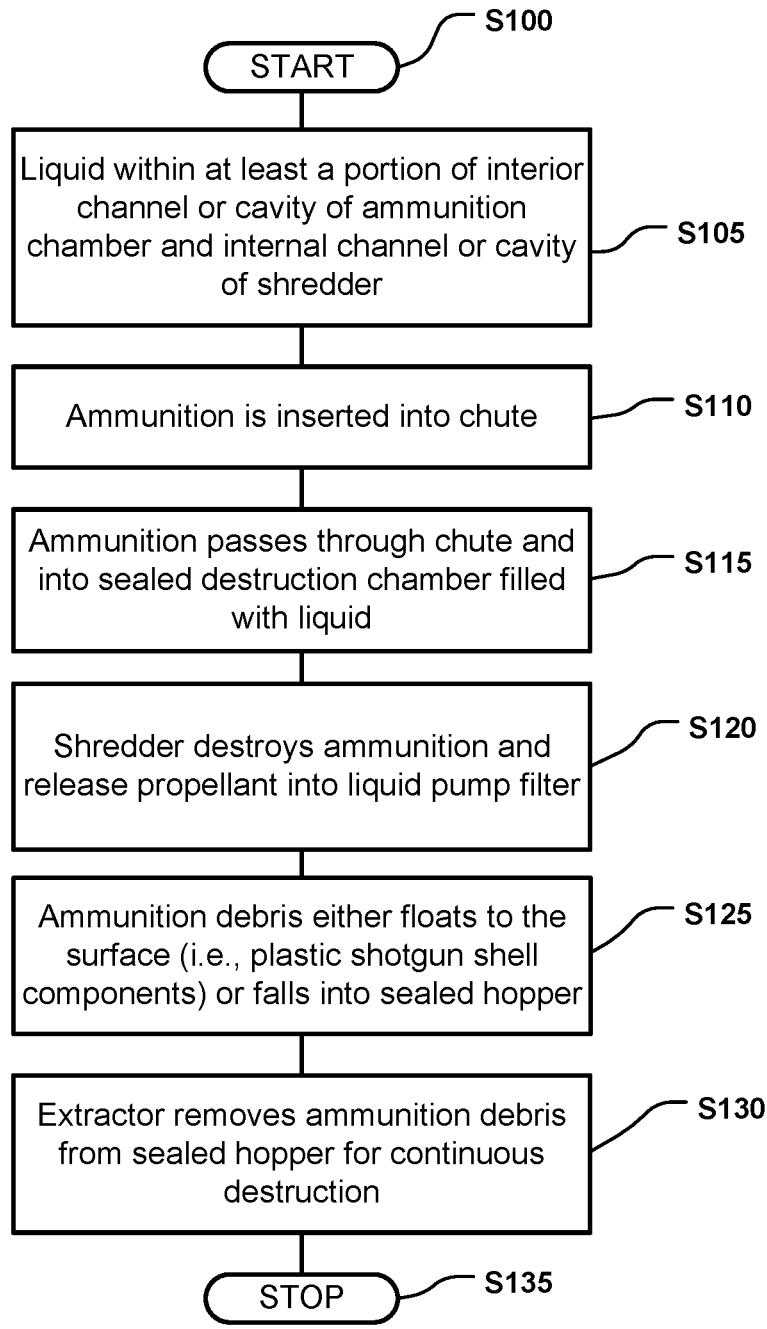
FIG. 5 illustrates an exemplary flowchart outlining exemplary steps for ammunition disposal, according to the presently disclosed systems, methods, and/or apparatuses.

Turning now to the appended drawing figures, FIGS. 1-4 illustrate certain elements and/or aspects of certain illustrative, non-limiting embodiment(s) of the presently disclosed systems, methods, and/or apparatuses of an ammunition disposal system 100. FIG. 5 illustrates an exemplary flowchart outlining exemplary steps for ammunition disposal, according to the presently disclosed systems, methods, and/or apparatuses.

As illustrated in FIGS. 1-4, the ammunition disposal system 100 comprises at least some of a chute 105, a chute access portion 110, a collection chamber 120, a shredder assembly 140, a hopper 160, and an extractor 170.

In certain exemplary embodiments, the chute 105 comprises substantially parallel or inwardly sloping walls or wall portions that allow material disposed within the chute 105 to be gravity fed and directed downward, toward the collection chamber 120. In various exemplary embodiments, the chute 105 includes an open upper portion 103, which allows access to an interior channel or cavity 107 of the chute 105. The chute 105 extends to a chute output aperture 109.

The chute access portion 110 extends from a chute access input aperture 111 to a chute access output aperture 112. An interior channel or cavity 114 is formed within at least a portion of the chute access portion 110 and is formed by one or more interior sidewalls of the chute access portion 110. The chute 105 is attached or coupled to the chute access portion 110 such that the chute output aperture 109 is aligned with the chute access input aperture 111 and the interior channel or cavity 107 of the chute 105 is in communication with the interior channel or cavity 114 of the chute access portion 110. In this manner, items or material placed within the chute 105 may be transferred from the interior channel or cavity 107 to the interior channel or cavity 114.

In various exemplary embodiments, a chute access door 115 is formed or positioned within at least a portion of the chute access portion 110. The chute access door 115 may optionally be an outward opening door, which allows access to an interior channel or cavity of the chute 105 and/or the chute access portion 110.

In certain exemplary embodiments, the chute access door 115 includes one or more baffles or walls that allow items or material to be placed within the chute access door 115 but prohibit or limit the ability to withdraw items or material from the chute access door 115, once the chute access door 115 has been closed. It should be appreciated that, in various exemplary embodiments, the chute access door 115 may be similar to a bank deposit or dropbox.

The collection chamber 120 extends from a collection chamber input aperture 121 to a collection chamber output aperture 122. An interior channel or cavity 124 is formed within at least a portion of the collection chamber 120 and is defined by one or more interior side walls of the collection chamber 120.

The collection chamber 120 is attached or coupled to the chute access portion 110, such that the chute access output aperture 112 is aligned with the collection chamber input aperture 121 and the interior channel or cavity 114 of the chute access portion 110 is in communication with the interior channel or cavity 124 of the collection chamber 120. In this manner, items or material within the chute access portion 110 may be transferred from the interior channel or cavity 114 to the interior channel or cavity 124.

In various exemplary embodiments, chute access portion 110 is attached or coupled atop the collection chamber 120 such that a hermetic or watertight seal is formed between the interior channel or cavity 114 of the chute access portion 110 and the interior channel or cavity 124 of the collection chamber 120.

In various exemplary embodiments, at least a portion of the interior channel or cavity 124 of the collection chamber 120 is substantially spherical in shape. It should be appreciated that the interior channel or cavity 124 of the collection chamber 120 may comprise a shape other than spherical (such as, for example, substantially square or substantially rectangular).

In certain exemplary, nonlimiting embodiments, a liquid inlet 127 and a liquid outlet 125 may optionally be formed through at least a portion of the interior side wall of the collection chamber 120. The liquid inlet 127 and the liquid outlet 125 allow for fluid to be communicated into and out of the interior channel or cavity 124.

A pump 130 may be in fluid communication with one or more of the liquid inlet 127 and the liquid outlet 125, so as to allow fluid to be pumped into and/or out of the interior channel or cavity 124. In various exemplary embodiments, the pump 130 is in fluid communication with the liquid inlet 127, via a hose or pipe 137, and in fluid communication with the liquid outlet 125, via a hose or pipe 135.

In certain exemplary embodiments, the pump 130 also includes a filter or filtering system, which allows a liquid 190 to be filtered as it passes through at least a portion of the pump 130. The pump 130 may also optionally act as a low liquid alarm, signaling when the liquid 190 reaches or is below a determined level within the interior channel or cavity 124 of the collection chamber 120.

The shredder assembly 140 extends from a shredder assembly input aperture 141 to a shredder assembly output aperture 142. An interior channel or cavity 144 is formed within at least a portion of the shredder assembly 140 and is defined by one or more interior side walls of the shredder assembly 140.

The shredder assembly 140 is attached or coupled to the collection chamber 120, such that the collection chamber output aperture 122 is aligned with the shredder assembly input aperture 141 and the interior channel or cavity 124 of the collection chamber 120 is in communication with the interior channel or cavity 144 of the shredder assembly 140. In this manner, items or material within the collection chamber 120 may be transferred from the interior channel or cavity 124 to the interior channel or cavity 144.

In various exemplary embodiments, collection chamber 120 is attached or coupled atop the shredder assembly 140 such that a hermetic or watertight seal is formed between the interior channel or cavity 124 of the collection chamber 120 and the interior channel or cavity 144 of the shredder assembly 140.

One or more shredder blade assemblies 145 are positioned within the interior channel or cavity 144 of the shredder assembly 140. In various exemplary embodiments, an electric or other motor 150 supplies a rotational force to the shredder blade assemblies 145, via, for example, a shaft 147. In various exemplary embodiments, one or more motors 150 may be utilized to provide rotational force to one or more shredder blade assemblies 145. Alternatively, a motor 150 may supply a rotational force to a plurality of shredder blade assemblies 145 via a geared assembly and one or more shafts 147.

The one or more shredder blade assemblies 145 are typically selected so as to be sufficient to shred various metals of the type typically used to construct ammunition.

The one or more shredder blade assemblies 145 are rotationally positioned within the interior channel or cavity 144 of the shredder assembly 140 such that a hermetic or watertight seal is maintained within the interior channel or cavity 144.

The hopper 160 extends from a hopper input aperture 161 to a hopper output aperture 162. An interior channel or cavity 164 is formed within at least a portion of the hopper 160 and is defined by one or more interior side walls of the hopper 160.

The hopper 160 is attached or coupled to the shredder assembly 140, such that the shredder assembly output aperture 142 is aligned with the hopper input aperture 161 and the interior channel or cavity 144 of the shredder assembly 140 is in communication with the interior channel or cavity 164 of the hopper 160. In this manner, items or material within the shredder assembly 140 may be transferred from the interior channel or cavity 144 to the interior channel or cavity 164.

In various exemplary embodiments, shredder assembly 140 is attached or coupled atop the hopper 160 such that a hermetic or watertight seal is formed between the interior channel or cavity 144 of the shredder assembly 140 and the interior channel or cavity 164 of the hopper 160.

In various exemplary embodiments, the interior side walls of the hopper 160 include one or more inwardly tapered sidewalls. In this manner, as material passes through the interior channel or cavity 164 of the hopper 160, material can be at least partially condensed before exiting the hopper output aperture 162.

The extractor 170 extends from an extractor input aperture 171 to an extractor output aperture 172. An interior channel or cavity 174 is formed within at least a portion of the extractor 170 and is defined by one or more interior side walls of the extractor 170.

The extractor 170 is attached or coupled to the extractor 170, such that the hopper output aperture 162 is aligned with the extractor input aperture 171 and the interior channel or cavity 164 of the hopper 160 is in communication with the interior channel or cavity 174 of the extractor 170. In this manner, items or material within the extractor 170 may be transferred from the interior channel or cavity 164 to the interior channel or cavity 174.

In various exemplary embodiments, extractor 170 is attached or coupled below the hopper 160 such that a hermetic or watertight seal is formed between the interior channel or cavity 174 of the extractor 170 and the interior channel or cavity 164 of the hopper 160.

In various exemplary embodiments, an auger 180 is positioned within at least a portion of the interior channel or cavity 174 of the extractor 170. In this manner, as material exits the hopper output aperture 162 of the hopper 160 and enters the extractor input aperture 171, the material is engaged by the auger 180 and transferred along the interior channel or cavity 174 of the extractor 170, toward the extractor output aperture 172. Material can be transferred from the interior channel or cavity 174 of the extractor 170 through the extractor output aperture 172.

An electric or other motor 155 optionally supplies a rotational force to the auger 180.

In certain embodiments, the extractor output aperture 172 is positioned above at least a portion of the collection chamber 120. In this manner, when the liquid 190 is added to the ammunition disposal system 100, the level of liquid 190 within the collection chamber 120 does not cause the level of liquid 190 within the inner channel or cavity 174 of the extractor 170 to flow out of the extractor output aperture 172.

A valve 165 may optionally be positioned proximate the extractor input aperture 171. If included, the valve 165 may be configured to be mechanically or physically operating between an open position and a closed position. In the closed position, liquid 190 (and any materials suspended or contained within the liquid 190) is maintained within the interior channel or cavity 174 of the extractor 170. When the valve 165 is in the open position, liquid 190 (and any materials suspended or contained within the liquid 190) are permitted to flow through the valve 165, and out of the interior channel or cavity 174 of the extractor 170.

Various exemplary embodiments, at least certain of the elements of the ammunition disposal system 100 are supported by a stand 180.

In various exemplary, non-limiting embodiments, discrete portions or elements of the ammunition disposal system 100 may be made of steel or ballistic steel. Alternate materials of construction or portions or elements of the ammunition disposal system 100 may include one or more of the following: steel, stainless steel, aluminum, titanium, polytetrafluoroethylene, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the ammunition disposal system 100 is a design choice based on the desired appearance and functionality of the ammunition disposal system 100.

FIG. 5 illustrates an exemplary flowchart outlining exemplary steps for utilizing the ammunition disposal system 100. The method begins at step S100 and continues to step S105, wherein an appropriate liquid 190 fills at least a portion of the interior channel or cavity 124 of the collection chamber 120, the interior channel or cavity 144 of the shredder assembly 140, the interior channel or cavity 164 of the hopper 160, and the interior channel or cavity 174 of the extractor 170. Certain exemplary embodiments, the liquid 190 can be added to the ammunition disposal system 100 through the chute 105, the chute access portion 110, the pump 130, and/or the valve 165.

In various exemplary, nonlimiting embodiments, the liquid 190 is selected based upon the ability of the liquid 190 to keep the various components or elements of the ammunition to be destroyed from igniting or detonating. If certain of the components or elements of the ammunition to be destroyed does ignite or detonate, within the collection chamber 120, the shredder assembly 140, the hopper 160, or the extractor 170, the liquid 190 and extinguish the igniting materials and/or up to contain the detonated components or elements. The liquid 190 may also be selected based on its ability to break down certain of the elements or components of the ammunition or its ability to be recycled or removed from the shredded elements or components of the ammunition.

Certain exemplary embodiments, the liquid 190 is selected upon the viscosity or specific gravity of the liquid 190. A particular specific gravity for the liquid 190 may be chosen based upon the desired shredded materials that are to float in the liquid 190 and the desired shredded materials that are to sink in the liquid 190.

Once the liquid 190 is filled to an appropriate level, the method advances to step S110 and ammunition 200 (or other items) may be deposited within the chute 105. It should be appreciated that the ammunition 200 (or other items) may be deposited, for example, through an open upper portion 103 or the chute access door 115.

The method than advances to step S115 and the ammunition 200 (or other items) pass into the sealed destruction chamber formed by the interior channel or cavity 124 of the collection chamber 120.

Then, in step S120, gravity causes the ammunition 200 (or other items) to pass from the interior channel or cavity 124 of the collection chamber 120 into the interior channel or cavity 144 of the shredder assembly 140. As the ammunition 200 (or other items) enter the interior channel or cavity 144, the rotating shredder blade assemblies 145 shred, pulverize, or otherwise break down the components of the ammunition 200 (or other items).

It should be appreciated that the type and size of the shredder blade assemblies 145 is a design choice based upon the desired materials that are to be shredded and/or the approximate desired size of the resultant, shredded materials.

In step S125, the ammunition 200 (or other items) are processed through the shredder blade assemblies 145. As the shredded metal or solid components of the ammunition 200 (or other items), which have a specific gravity greater than the specific gravity of the liquid 190 (i.e., lead, brass, or steel components), are processed through the shredder blade assemblies 145, the shredded metal or solid components exit the interior channel or cavity 144 of the shredder assembly 140 and flow into the interior channel or cavity 164 of the hopper 160. As the shredded components of the ammunition 200 (or other items), which have a specific gravity less than the specific gravity of the liquid 190 (i.e., plastic shotgun shell components), are processed through the shredder blade assemblies 145, these shredded components float to the surface of the liquid 190 where they can be retrieved.

In various exemplary embodiments, the pump 130 operates to circulate the liquid 190 within the interior channel or cavity 124 of the collection chamber 120. In certain exemplary embodiments, the liquid 190 is pumped through the pump 130 and into the interior channel or cavity 124, via the liquid inlet 127. Liquid 190 is extracted from the interior channel cavities 124, via the liquid outlet 125. In various exemplary embodiments, the pump 130 also acts to filter the liquid 190, as the liquid 190 passes through the pump 130 or certain systems utilized in conjunction with the pump 130.

In step S130, the shredded components that flow through interior channel or cavity 164 and into the interior channel or cavity 174 are engaged by the rotating auger 180 and moved through the interior channel or cavity 174 of the extractor 170 and through the extractor output aperture 172.

The method than advances to step S135 and the method ends.

In certain exemplary embodiments, propellant materials contained within the ammunition 200 (or other items) may be dissolved or partially dissolved within the liquid 190. In these embodiments, the liquid 190 can be removed from the ammunition disposal system 100 and disposed of or recycled in such a manner that the propellant materials are removed from the liquid 190.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. An ammunition disposal system, comprising:
   a chute having a cavity and extending to a chute output aperture;
   a chute access portion having a cavity and extending from a chute access input aperture to a chute access output aperture, wherein said chute is attached or coupled to said chute access portion such that said chute output aperture is aligned with said chute access input aperture and said cavity of said chute is in fluid communication with said cavity of said chute access portion;
   a collection chamber having a cavity and extending from a collection chamber input aperture to a collection chamber output aperture, wherein said collection chamber is attached or coupled to said chute access portion such that said chute access portion output aperture is aligned with said collection chamber input aperture and said cavity of said chute access portion is in fluid communication with said cavity of said collection chamber, and wherein said chute access portion is attached or coupled to said collection chamber such that a watertight seal is formed between said cavity of said chute access portion and said cavity of said collection chamber, and wherein a liquid inlet and a liquid outlet are formed through at least a portion of said collection chamber and are in fluid communication with said cavity of said collection chamber;
   a shredder assembly having a cavity and extending from a shredder assembly input aperture to a shredder assembly output aperture, wherein said shredder assembly is attached or coupled to said collection chamber such that said collection chamber output aperture is aligned with said shredder assembly input aperture and said cavity of said collection chamber is in fluid communication with said cavity of said shredder assembly, wherein said collection chamber is attached or coupled to said shredder assembly such that a watertight seal is formed between said cavity of said mission chamber and said cavity of said shredder assembly, and wherein one or more shredder blade assemblies are positioned within said cavity of said shredder assembly;
   a hopper having a cavity and extending from a hopper input aperture to a hopper access output aperture, wherein said hopper is attached or coupled to said shredder assembly such that said shredder assembly output aperture is attached or coupled to aligned with said hopper input aperture and said cavity of said shredder assembly is in fluid communication with said cavity of said hopper, and wherein said shredder assembly is attached or coupled to said hopper such that a watertight seal is formed between said cavity of said shredder assembly and said cavity of said hopper;
   an extractor having a cavity and extending from an extractor input aperture to an extractor output aperture, wherein said extractor is attached or coupled to said hopper such that said hopper output aperture is attached or coupled to aligned with said extractor input aperture and said cavity of said hopper is in fluid communication with said cavity of said extractor, wherein said hopper is attached or coupled to said extractor such that a watertight seal is formed between said cavity of said hopper and said cavity of said extractor, and wherein an auger is positioned within at least a portion of said cavity of said extractor;
   a liquid, wherein said liquid flows from at least a portion of said cavity of said collection chamber to said collection chamber output aperture, through said collection chamber output aperture of said collection chamber and into said shredder assembly input aperture of said shredder assembly, through said cavity of said shredder assembly to said shredder assembly output aperture of said shredder assembly and into said hopper input aperture of said hopper, through said cavity of said hopper, and into said cavity of said extractor; and
   a pump, wherein said pump is in fluid communication with said liquid inlet or said liquid outlet, so as to allow said liquid to be pumped into and/or out of said cavity of said collection chamber.

2. The ammunition disposal system of claim 1, wherein said chute includes an open upper portion, which allows access to said cavity of said chute.

3. The ammunition disposal system of claim 1, wherein a chute access door is formed or positioned within at least a portion of said chute access portion, and wherein said chute access door allows access to said cavity of said chute or allows access to said cavity of said chute access portion.

4. The ammunition disposal system of claim 1, wherein at least a portion of said cavity of said collection chamber is spherical.

5. The ammunition disposal system of claim 1, wherein said liquid inlet and said liquid outlet are formed through at least a portion of said collection chamber and are in fluid communication with said cavity of said collection chamber, wherein said liquid inlet and said liquid outlet allow said liquid to be communicated into and out of said cavity of said collection chamber.

6. The ammunition disposal system of claim 1, wherein said pump comprises a filter, which allows said liquid to be filtered as it passes through at least a portion of said pump.

7. The ammunition disposal system of claim 1, wherein a motor supplies a rotational force to said shredder blade assemblies.

8. The ammunition disposal system of claim 1, wherein said auger is positioned within at least a portion of said cavity of said extractor, such that as material enters said extractor input aperture, said material is transferred, via said auger, along said cavity of said extractor, toward said extractor output aperture.

9. The ammunition disposal system of claim 1, wherein a motor supplies a rotational force to said auger.

10. The ammunition disposal system of claim 1, wherein said extractor output aperture is positioned above at least a portion of said collection chamber.

11. The ammunition disposal system of claim 1, wherein a valve is positioned proximate said extractor input aperture such that when said valve is in an open position, said liquid is permitted to flow through said valve, and out of said cavity of said extractor.

12. The ammunition disposal system of claim 1, wherein at least a portion of said collection chamber comprises steel or ballistic steel.

13. The ammunition disposal system of claim 1,
wherein said liquid is able to extinguish any ignited materials.

14. The ammunition disposal system of claim 1, wherein said liquid is selected based upon a specific gravity of said liquid.

15. The ammunition disposal system of claim 1, wherein said liquid is selected based upon a viscosity of said liquid.

16. An ammunition disposal system, comprising:
a chute access portion;
a collection chamber aligned with and attached or coupled to said chute access portion such that an interior cavity of said chute access portion is in fluid communication with an interior cavity of said collection chamber, and wherein a liquid inlet and a liquid outlet are formed through at least a portion of said collection chamber and are in fluid communication with said interior cavity of said collection chamber;
a shredder assembly aligned with and attached or coupled to said collection chamber such that said interior cavity of said collection chamber is in fluid communication with an interior cavity of said shredder assembly, and wherein one or more shredder blade assemblies are positioned within said interior cavity of said shredder assembly;
a hopper aligned with and attached or coupled to said shredder assembly such that said interior cavity of said shredder assembly is in fluid communication with an interior cavity of said hopper;
an extractor attached or coupled to said hopper such that said interior cavity of said hopper is in fluid communication with an interior cavity of said extractor, and wherein an auger is positioned within at least a portion of said interior cavity of said extractor; and
a liquid, wherein said liquid flows from within at least a portion of said interior cavity of said collection chamber, directly through said interior cavity of said shredder assembly, through said interior cavity of said hopper, and into said interior cavity of said extractor, and wherein said liquid is pumped into and/or out of said interior cavity of said collection chamber via said liquid inlet or said liquid outlet.

* * * * *